United States Patent
Krishnamurthi et al.

(10) Patent No.: US 7,564,785 B2
(45) Date of Patent: Jul. 21, 2009

(54) DYNAMIC FLOW CONTROL SUPPORT

(75) Inventors: Raju Krishnamurthi, Karnataka (IN); Sachin Doshi, Karnataka (IN); Vijay Chougule, Karnataka (IN)

(73) Assignee: Intel Corporation, Santa Clara, CA (US)

( * ) Notice: Subject to any disclaimer, the term of this patent is extended or adjusted under 35 U.S.C. 154(b) by 756 days.

(21) Appl. No.: 10/852,767

(22) Filed: May 21, 2004

(65) Prior Publication Data
US 2005/0259575 A1  Nov. 24, 2005

(51) Int. Cl.
H04L 12/26  (2006.01)
H04L 1/00  (2006.01)

(52) U.S. Cl. ............ 370/230; 370/231; 370/235; 370/236; 370/237

(58) Field of Classification Search .......... 370/231, 370/229, 235, 236, 237, 230
See application file for complete search history.

(56) References Cited

U.S. PATENT DOCUMENTS

| | | | |
|---|---|---|---|
| 5,956,322 A * | 9/1999 | Charny | 370/236.1 |
| 6,026,075 A * | 2/2000 | Linville et al. | 370/236 |
| 6,167,054 A * | 12/2000 | Simmons et al. | 370/422 |
| 6,618,357 B1 * | 9/2003 | Geyer et al. | 370/236 |
| 6,658,027 B1 * | 12/2003 | Kramer et al. | 370/516 |
| 6,975,637 B1 * | 12/2005 | Lenell | 370/412 |
| 2003/0172220 A1 * | 9/2003 | Hao | 710/305 |
| 2003/0218981 A1 * | 11/2003 | Scholten | 370/235 |
| 2004/0047290 A1 * | 3/2004 | Komandur et al. | 370/230 |
| 2005/0114498 A1 * | 5/2005 | Gonzalez et al. | 709/224 |
| 2006/0164986 A1 * | 7/2006 | Rinne | 370/231 |

OTHER PUBLICATIONS

Intel, "Flow Control in IXF1010 and IXF1110 10-port Gigabit Ethernet Media Access Controllers" (Apr. 2002).

* cited by examiner

*Primary Examiner*—Chi H Pham
*Assistant Examiner*—Farah Faroul
(74) *Attorney, Agent, or Firm*—Fish & Richardson P.C.

(57) ABSTRACT

A method for dynamic flow control includes accepting incoming data into a shared resource during a first time period after transmitting a flow control message, and diverting incoming data from the shared resource during a second time period that is after the first time period.

34 Claims, 4 Drawing Sheets

DYNAMIC FLOW CONTROL SUPPORT

BACKGROUND

Some data communications networks use flow control to regulate the flow of data and reduce network congestion at points within a network. A node receiving a stream of data from another node over a network sends a flow control message to indicate when a memory buffer is congested and more data should not be sent and/or to indicate when a memory buffer is ready to receive more data.

A switch uses flow control for some of its ports to regulate data received on those ports from nodes in the network. A switch port that has a dedicated bi-directional link to a node (a "link partner") communicates with that node using a full-duplex Ethernet protocol that is configured upon initialization of the link using "auto-negotiation."

During auto-negotiation, the switch advertises its own abilities to the link partner and receives advertised abilities of the link partner. The switch compares the two sets of abilities to determine how to configure the settings for the Ethernet protocol, including whether the link partner supports flow control (i.e., responds to flow control messages). The switch uses those settings until the link goes down or is reset.

DESCRIPTION

Figure 1:
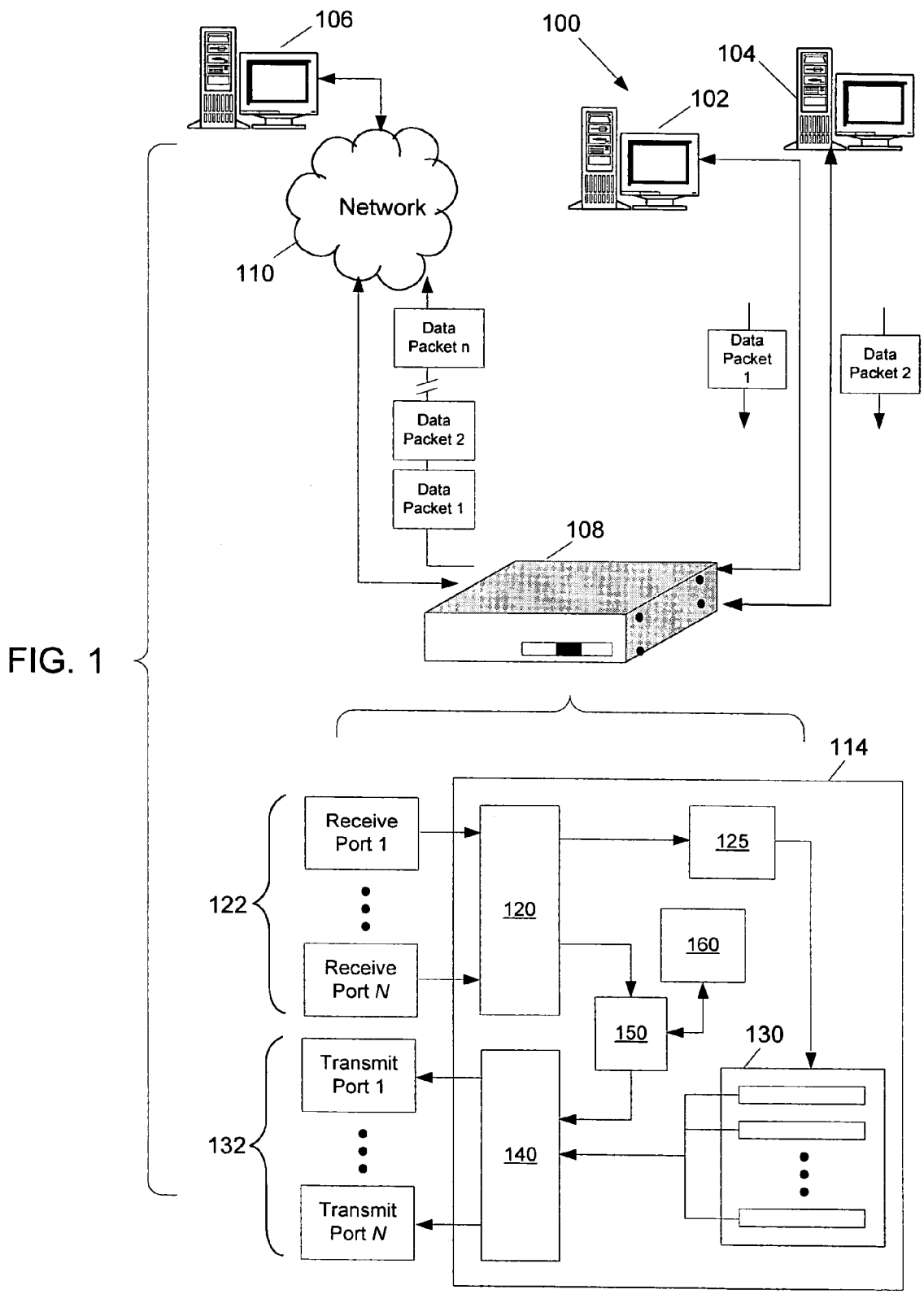
FIG. 1 is a block diagram depicting a system for transferring data among computer systems.

Referring to FIG. 1, a system 100 for transmitting data among computer systems includes a network device 108 (e.g., a router or switch) for directing data packets. Some computer systems (e.g., computer systems 102 and 104) are in communication with the network device 108 over a dedicated link. Other computer systems (e.g., computer systems 106) are in communication with the network device 108 via a network 110 (e.g., a local area network or a wide area network). The network device 108 includes a network processing engine 114 that collects data packets received over a set of receive ports 122 and directs the data over one of set of transmit ports 132 for delivery to the appropriate destination computer system. In this example, "data packet_1" is transmitted from the computer system 102 for delivery to computer system 106 and "data packet_2" is transmitted from computer system 104 for delivery to computer system 106.

The network device 108 includes receive ports 122 and transmit ports 132 that are paired together (e.g., on a line card) for communicating over a full-duplex link to a single "link partner" (e.g., computer system 102 or 104, or a node of the network 110). Alternatively, the network device 108 may include a bidirectional port (i.e., a port that acts both as a transmit port and a receive port) for communicating over a "half-duplex" shared access medium to a device in communication with the shared access medium (e.g., computer system 106 or a node of the network 110).

Individual line cards may include one or more physical layer (PHY) devices (e.g., optic, wire, and wireless PHYs) that handle communication over network connections. The PHY devices translate between the physical signals carried by different network mediums and the bits (e.g., "0"-s and "1"-s) used by digital systems. The line cards may also include framer devices (e.g., Ethernet, Synchronous Optic Network (SONET), High-Level Data Link (HDLC) framers or other "layer 2" devices) that can perform operations on frames such as error detection and/or correction.

The network processing engine 114 includes an aggregation module 120 that collects data packets received from the receive ports 122. When a packet is received, the header portion of the packet is sent to the control module 125 for processing, and a packet memory manager 150 temporarily stores the data payload portion of the packet in a packet buffer 160. The header portion of a collected data packet flows through the control module 125 before being switched to a transmit queue in a transmit queue manager 130 that is associated with one of the transmit ports 132. A distribution module 140 distributes packets with the appropriate headers from the transmit queues and data payload from the packet buffer 160 to the appropriate transmit port.

The control module 125 executes a flow control process to dynamically regulate the flow of data packets received over the receive ports 122. For example, the control module 125 monitors one or more shared resources such as the packet buffer 160 or the transmit queues in the transmit queue manager 130 to limit congestion of the shared resource.

Figure 2:
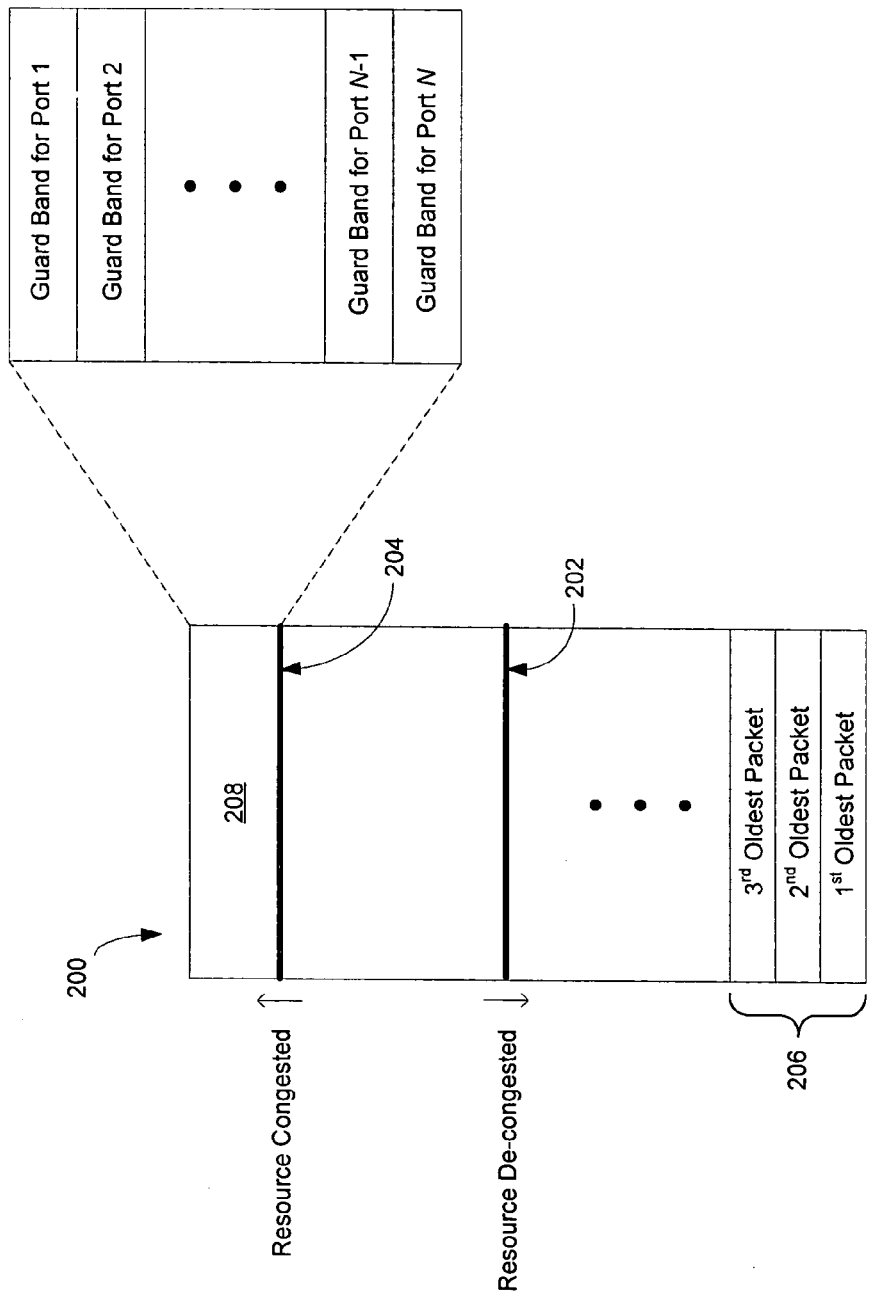
FIG. 2 is a diagram of a switch memory buffer.

Referring to FIG. 2, a packet buffer 200 is an example of a shared resource that is monitored by the control module 125. As the packet buffer 200 stores an increasing number of data packets, the packet buffer 200 fills past a "low water mark" position 202 and past a "high water mark" position 204. Received data packets are schematically shown to fill the packet buffer 200 from the bottom to the top (e.g., according to a first-in first-out queuing scheme). For example, the three oldest packets 206 are logically shown to occupy the three lowest positions. However, data packets can be stored at any physical storage location of a memory device implementing the packet buffer 200.

After the packet buffer 200 crosses the high water mark position 204, the control module 125 sends a flow control pause message (e.g., an Ethernet Pause Frame with a nonzero pause time) over some or all of the transmit ports 132 to pause any link partners (e.g., computer system 102 or 104) that are transmitting data packets to a corresponding set of receive ports, i.e., "congesting receive ports," which could be a subset or the entire set of receive ports 122. Optionally, the control module 125 may only send a flow control pause message to a congesting link partner that claims to support flow control (e.g., using auto-negotiation).

After sending a flow control pause message, the control module 125 allows a limited number of packets to be stored in a guard band 208 for packets that may be in transit from one or more link partners. In this example, the size of the guard band 208 is large enough to store a residual stream of data packets received at each of the congesting receive ports of the network device 108. For example, the residual data packets may have been in transit before and during reception of the flow control pause message. After a predetermined amount of time, any further data packets received on the congesting receive ports during the pause time by the network device 108 are diverted from the packet buffer 200 (e.g., discarded or processed in some other way).

A link partner that supports flow control will stop transmitting data packets for a "pause time" that is indicated in the flow control pause message after receiving and processing (e.g., decoding) the flow control pause message. The link partner may continue to send control packets during the pause time that are processed but not stored in the packet buffer 200.

Some link partners may claim to support flow control (e.g., based on an auto-negotiation protocol) but may continue to send data packets during the pause time anyway. In this case, such a link partner does not gain unfair usage of the packet buffer 200 since the control module 125 accepts incoming data over a receive port into the packet buffer 200 for a limited time after transmitting a flow control pause message, and rejects incoming data over the port subsequently for the duration of the pause time.

Other link partners may not support flow control at all. For such link partners, the control module 125 may not send a flow control pause message and may immediately start diverting packets from that link partner upon congestion (i.e., going above the high water mark 204) of the packet buffer 200. Alternatively, the control module 125 may treat all link partners the same, sending a flow control pause message over a transmit port of a congesting link partner without specifically detecting flow control support for that individual link partner.

During the pause time, the packet buffer 200 may become de-congested (i.e., have the number of stored packets drop below the low water mark 202) due to packets being removed from the packet buffer 200 (e.g., for processing, or for transmission). If the packet buffer becomes de-congested before the pause time expires, the control module 125 can send a paused link partner a flow control message (e.g., an Ethernet Pause Frame with a zero pause time) to resume transmissions from that link partner. If the pause time is about to expire and the packet buffer 200 is still filled past the low water mark 202, the control module 125 can send another flow control pause message to each paused link partner. This second flow control pause message can be timed to arrive at the link partner before the link partner resumes transmissions.

Figure 3:
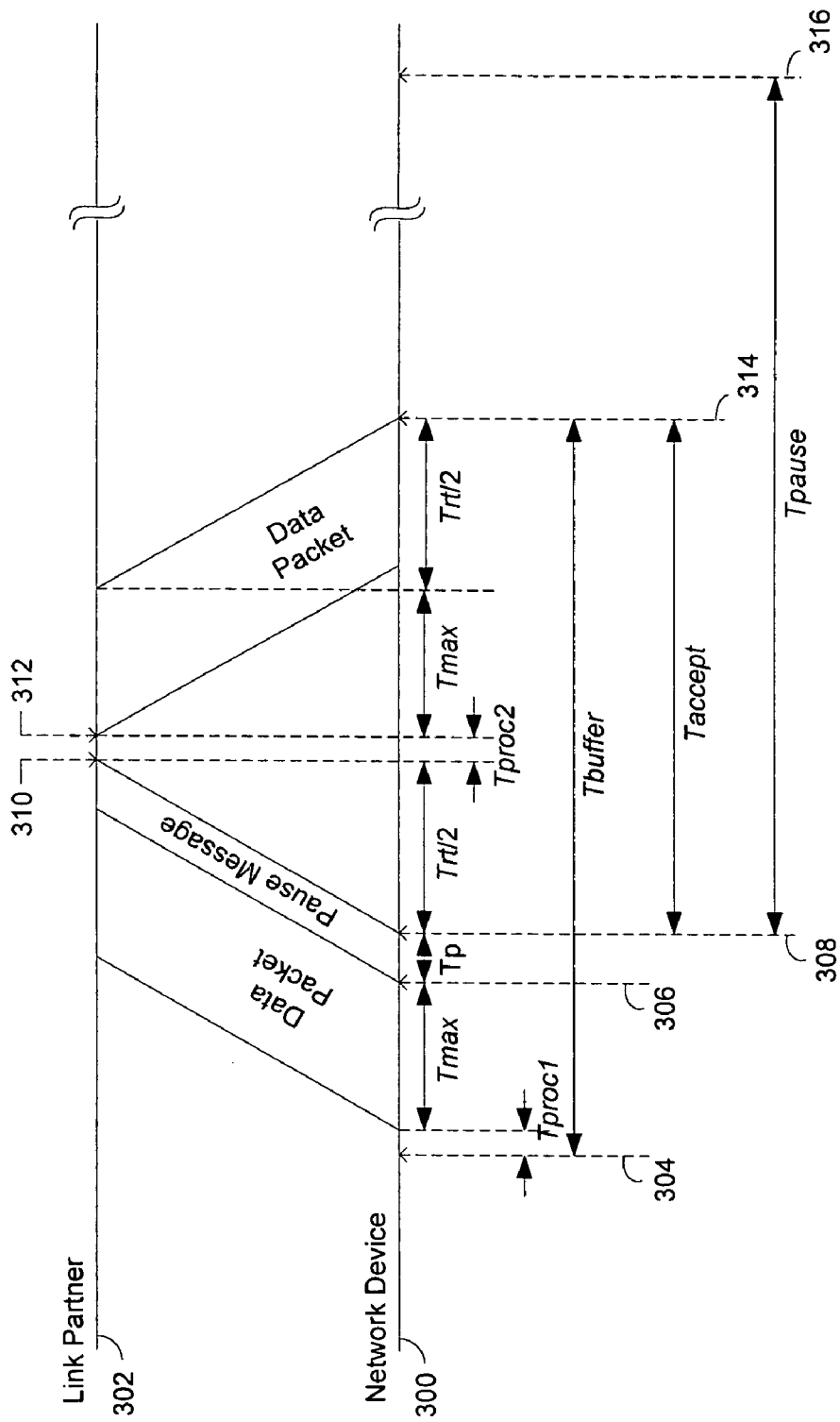
FIG. 3 is a timeline schematic for transmissions between a switch and a link partner.

Referring to FIG. 3, a timeline schematic showing transmissions between a network device 108 and a link partner during a flow control process includes a timeline 300 for events at the network device 108 and a timeline 302 for events at the link partner. The timing of events shows a worst-case scenario for an amount of time Tbuffer during which the network device 108 will accept data from the link partner for storage in the packet buffer 200.

At time 304 the network device 108 begins to receive a data packet that causes the packet buffer 200 to cross the high water mark 204 (e.g., the first byte of the data packet crosses the high water mark). The control module 125 may detect the congestion (e.g., after a processing time Tproc1), but may not be able to start transmitting a flow control pause message immediately because the corresponding transmit port may have just begun a maximum length packet transmission. This may delay the transmission of a flow control pause message until a time 306 that occurs a maximum length packet transmission time Tmax and a processing time Tproc1 (which in some cases, may be negligible compared to Tmax) after time 304.

A time 308 corresponds to completion of the transmission of the flow control pause message and the start of a timer that the control module 125 uses to make flow control decisions. The timer can be implemented, for example, using a hardware or software timing mechanism in the network device 108. The control module 125 starts the timer at time 308 that occurs a transmission time Tp after time 306.

The link partner finishes receiving the flow control pause message at a time 310, a half round-trip time Trt/2 after time 308. The link partner processes (e.g., decodes and reads) the flow control pause message for a time Tproc2, and finishes transmitting any data packet that it has started transmitting. If the link partner supports flow control, then the link partner will not transmit further transmissions until expiration of the pause time. In a worst-case scenario, the link partner just starts transmitting a data packet at time 312. The control module 125 accepts data from the link partner until a time 314 that accounts for a maximum length packet transmission time Tmax and a half round-trip time Trt/2 after time 312. The amount of time from time 304 to time 314 corresponds to a "buffer time":

$$Tbuffer = 2\ Tmax + Trt + Tp + Tproc1 + Tproc2.$$

This buffer time is used to determine how much storage space to dedicate in the packet buffer 200 for the guard band 208. For example, the size of the guard band in bytes is R·N·Tbuffer, where R is the maximum rate for received data packets (in bytes/second), N is the number of ports sharing the packet buffer 200, and Tbuffer is the buffer time (in seconds).

After transmitting the flow control pause message to a link partner, the control module 125 accepts incoming data packets into the packet buffer 200 during a time period Taccept after transmitting the flow control pause message (i.e., from time 308 to time 314), as determined by the timer. The control module 125 diverts incoming data packets from the packet buffer 200 for the remainder of the pause time Tpause (i.e., from time 314 to time 316), as determined by the timer. If a data packet is received after the timer exceeds Taccept (e.g., from a link partner that claims to support flow control, but keeps transmitting data anyway) the data packet may be "dropped" (i.e., discarded) or processed according to a predetermined procedure.

Figure 4:
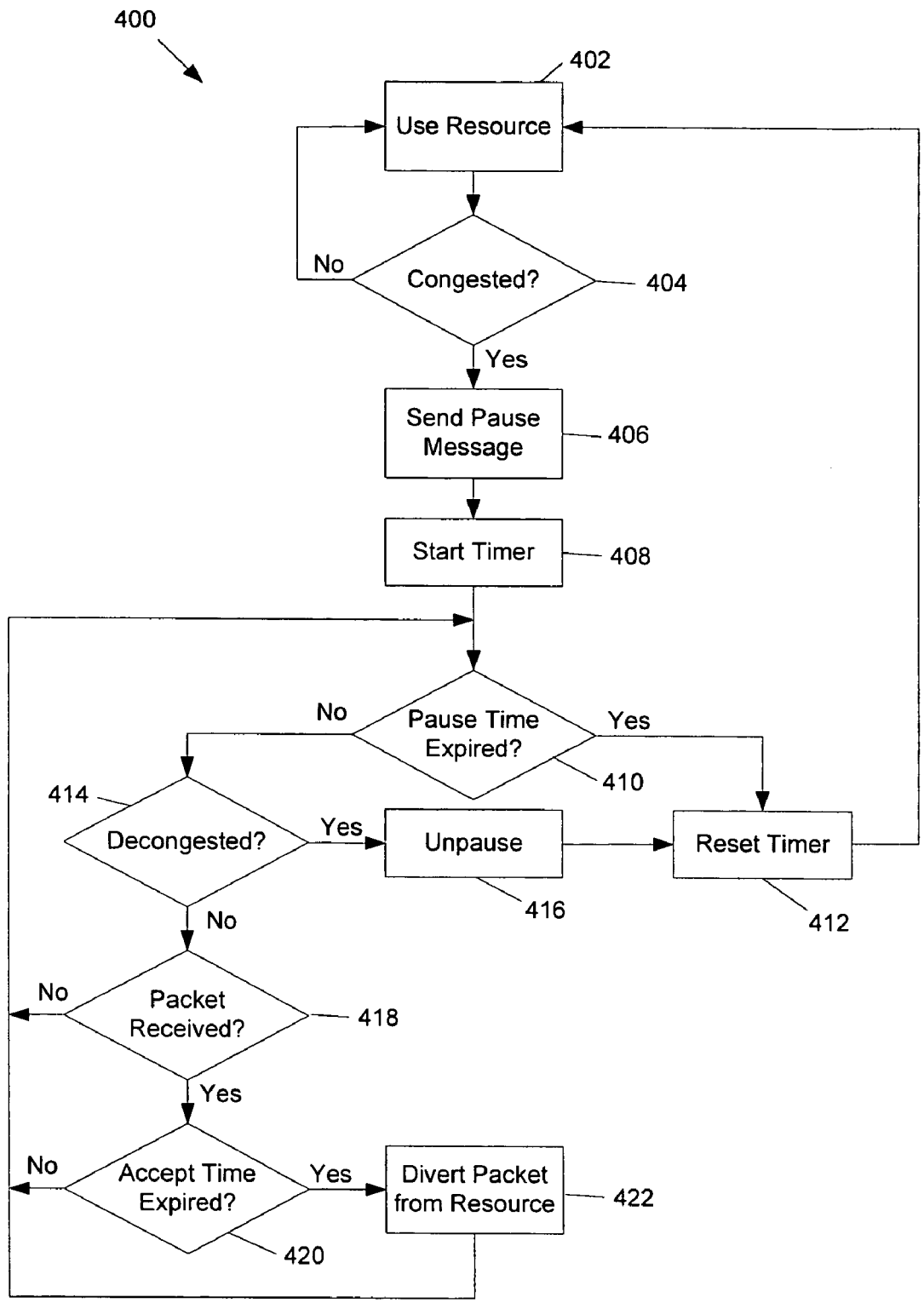
FIG. 4 is a flowchart for a flow control process.

Referring to FIG. 4, a generalized description of a flow control process 400 that is executed by the control module 125 includes using 402 a shared resource and periodically testing 404 the shared resource for congestion. If the resource is congested, the process 400 includes sending 406 a pause message (e.g., an Ethernet Pause Frame with a nonzero pause time) and starting 408 a timer. The timer is compared 410 to the pause time Tpause. If the pause time has been exceeded, the process 400 resets 412 the timer and returns to using 402 and testing 404 the shared resource.

If the pause time has not been exceeded, the process 400 determines 414 whether the resource is decongested, and if it is, unpauses 416 the link partner (e.g., sends an Ethernet Pause Frame with a zero pause time), resets 412 the timer, and returns to using 402 and testing 404 the shared resource. If the resource is still congested, the process determines 418 whether a data packet has been received, and if so, determines 420 whether the timer has exceeded the accept time Taccept. If either of these conditions is false, the process 400 returns to comparing 410 the timer to the pause time Tpause. Otherwise, if a data packet has been received and the timer has exceeded the accept time Taccept, then the received data packet is diverted 422 from the shared resource. After diverting 422 the packet, the process 400 returns to comparing 410 the timer to the pause time Tpause.

The term packet was sometimes used in the above description to refer to a frame. However, the term packet also refers to a TCP segment, fragment, Asynchronous Transfer Mode (ATM) cell, and so forth, depending on the network technology being used.

The processes and modules described herein can be implemented in digital electronic circuitry, or in computer hardware, firmware, software, or in combinations of them.

The processes described herein can be implemented as a computer program product, i.e., a computer program tangibly embodied in an information carrier, e.g., in a machine-readable storage device or in a propagated signal, for execution by, or to control the operation of, data processing apparatus, e.g., a processing device, a computer, or multiple computers. A computer program can be written in any form of programming language, including compiled, assembled, or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Particular embodiments have been described, however other embodiments are within the scope of the following claims. For example, the operations of the processes can be performed in a different order and still achieve desirable results.

What is claimed is:

1. A method comprising:
    accepting incoming data into a shared resource during a first time period after transmitting a flow control message; and
    diverting incoming data from the shared resource during a second time period that is after the first time period;
    wherein the first time period has a length that is based at least in part on a maximum length packet transmission time, and the second time period has a length that is determined by the difference between a pause time indicated in the flow control message and the first time period.

2. The method of claim 1, further comprising:
    detecting congestion in the shared resource; and
    transmitting the flow control message after detecting the congestion in the shared resource.

3. The method of claim 1 wherein diverting incoming data comprises discarding the incoming data.

4. The method of claim 1 wherein diverting incoming data comprises processing the incoming data according to a predetermined procedure.

5. The method of claim 1 wherein the shared resource comprises a memory device.

6. The method of claim 5 wherein accepting incoming data into the shared resource comprises storing a received data packet in the memory device.

7. The method of claim 1 wherein the flow control message comprises a pause frame with a nonzero pause time.

8. The method of claim 1, further comprising transmitting a second flow control message after the shared resource becomes decongested.

9. The method of claim 8 wherein the second flow control message comprises a pause frame with a zero pause time.

10. The method of claim 1 wherein the first time period has a length that is longer than the maximum length packet transmission time plus a round-trip time to a link partner that receives the flow control message.

11. The method of claim 1, further comprising communicating with one or more link partners to advertise support for flow control.

12. The method of claim 11 wherein transmitting the flow control message includes transmitting the flow control message to each link partner without specifically detecting flow control support for that individual link partner.

13. The method of claim 11 wherein the communicating further includes receiving information about whether the link partners support flow control.

14. The method of claim 13 wherein transmitting the flow control message includes transmitting the flow control message to a subset of one or more of the link partners that claim to support flow control and not to a subset of one or more of the link partners that do not claim to support flow control.

15. An apparatus comprising:
    a shared resource;
    a plurality of ports configured to send data to the shared resource; and
    a control module configured to accept incoming data into the shared resource during a first time period after transmitting a flow control message; and
    divert incoming data from the shared resource during a second time period that is after the first time period;
    wherein the first time period has a length that is based at least in part on a maximum length packet transmission time, and the second time period has a length that is determined by the difference between a pause time indicated in the flow control message and the first time period.

16. The apparatus of claim 15 wherein the control module is further configured to:
    detect congestion in the shared resource; and
    transmit the flow control message after detecting the congestion in the shared resource.

17. The apparatus of claim 15 wherein diverting incoming data comprises discarding the incoming data.

18. The apparatus of claim 15 wherein diverting incoming data comprises processing the incoming data according to a predetermined procedure.

19. A processor comprising:
    circuitry configured to
    accept incoming data into a shared resource during a first time period after transmitting a flow control message; and
    divert incoming data from the shared resource during a second time period that is after the first time period;
    wherein the first time period has a length that is based at least in part on a maximum length packet transmission time, and the second time period has a length that is determined by the difference between a pause time indicated in the flow control message and the first time period.

20. The processor of claim 19 wherein the circuitry is further configured to:
    detect congestion in the shared resource; and
    transmit the flow control message after detecting the congestion in the shared resource.

21. The processor of claim 19 wherein diverting incoming data comprises discarding the incoming data.

22. The processor of claim 19 wherein diverting incoming data comprises processing the incoming data according to a predetermined procedure.

23. A computer-readable storage device storing computer-executable instructions for causing a computer to:
    accept incoming data into a shared resource during a first time period after transmitting a flow control message; and
    divert incoming data from the shared resource during a second time period that is after the first time period
    wherein the first time period has a length that is based at least in part on a maximum length packet transmission time, and the second time period has a length that is determined by the difference between a pause time indicated in the flow control message and the first time period.

24. The computer-readable storage device of claim 23 further storing instructions for causing a computer to:
    detect congestion in the shared resource; and transmit the flow control message after detecting the congestion in the shared resource.

25. The computer-readable storage device of claim 23 wherein diverting incoming data comprises discarding the incoming data.

26. The computer-readable storage device of claim 23 wherein diverting incoming data comprises processing the incoming data according to a predetermined procedure.

27. A system comprising:
a network device including a plurality of input ports for receiving data packets;
a control module in communication with the input ports; and
a wireless physical layer device in communication with the network device; wherein the control module is configured to
accept incoming data into a shared resource during a first time period after transmitting a flow control message; and
divert incoming data from the shared resource during a second time period that is after the first time period;
wherein the first time period has a length that is based at least in part on a maximum length packet transmission time, and the second time period has a length that is determined by the difference between a pause time indicated in the flow control message and the first time period.

28. The system of claim 27 wherein the control module is further configured to:
detect congestion in the shared resource; and
transmit the flow control message after detecting the congestion in the shared resource.

29. The system of claim 27 wherein diverting incoming data comprises discarding the incoming data.

30. The system of claim 27 wherein diverting incoming data comprises processing the incoming data according to a predetermined procedure. the link partners that do not claim to support flow control.

31. A method comprising:
communicating with multiple link partners;
accepting incoming data into a shared resource from each of a plurality of the multiple link partners;
detecting a first condition that indicates congestion in the shared resource;
transmitting a flow control message to one or more of the multiple link partners;
accepting incoming data into the shared resource during a first time period after transmitting the flow control message;
detecting a second condition that indicates the end of the first time period; and
diverting incoming data from the shared resource during a second time period that is after the first time period;
wherein the first time period has a length that is based at least in part on a maximum length packet transmission time, and the second time period has a length that is determined by the difference between a pause time indicated in the flow control message and the first time period.

32. The method of claim 31 wherein the first condition comprises a high water mark position that corresponds to a first amount of space that stores packets.

33. The method of claim 32 wherein the second condition comprises storing additional packets within a guard band position that corresponds to a second amount of space that stores packets, the second amount of space being larger than the first amount of space.

34. The method of claim 33, further comprising detecting a low water mark position that corresponds to a third amount of space that stores packets, the third amount of space being smaller than the first amount of space.

* * * * *